W. KLETTKE.
NUT LOCK.
APPLICATION FILED DEC. 17, 1914.
1,157,230.
Patented Oct. 19, 1915.
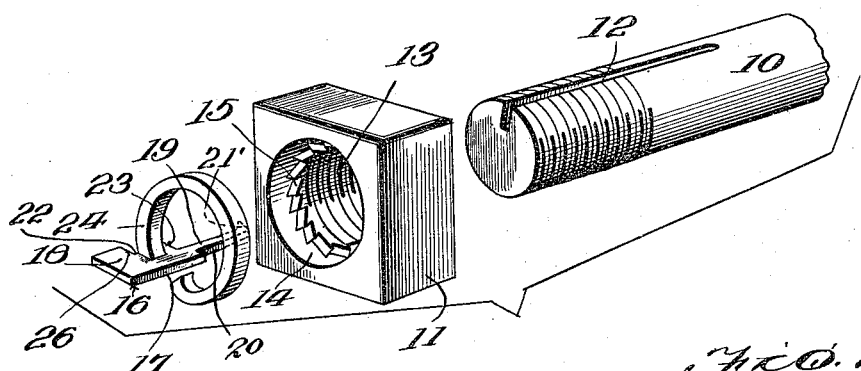
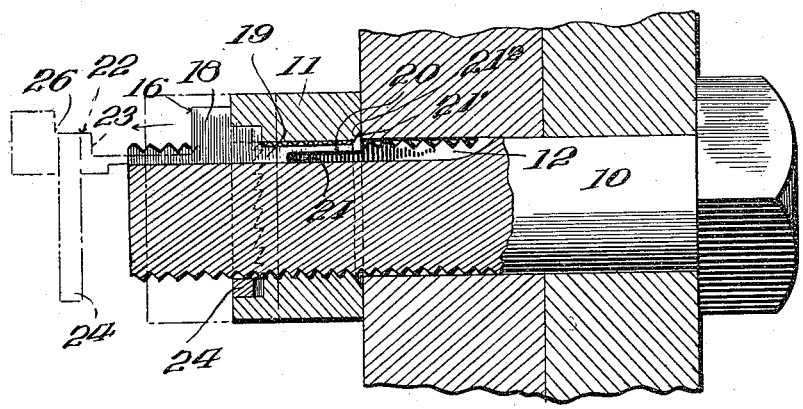
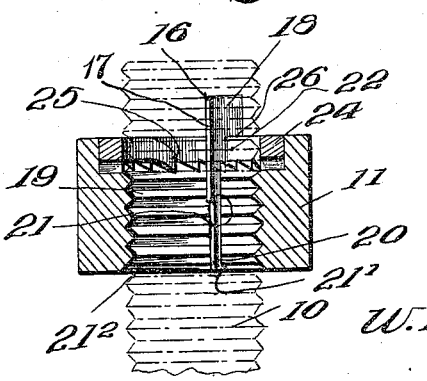
Inventor
W. Klettke.
Witnesses
By
Attorneys

UNITED STATES PATENT OFFICE.

WARNER KLETTKE, OF ESCANABA, MICHIGAN.

NUT-LOCK.

1,157,230. Specification of Letters Patent. Patented Oct. 19, 1915.

Application filed December 17, 1914. Serial No. 877,770.

*To all whom it may concern:*

Be it known that I, WARNER KLETTKE, a citizen of the United States, residing at Escanaba, in the county of Delta and State of Michigan, have invented certain new and useful Improvements in Nut-Locks, of which the following is a specification.

This invention relates to nut locks and has as its primary object to provide a device of this character wherein the nut may be locked at substantially any point in its turning movement upon the bolt and wherein any retrograde movement of the nut will be effectually prevented.

A further object of the invention is to provide in a device of this character, a locking key arranged to carry a locking ring, the locking key being disposed to seat within the bolt in engagement with the nut and the locking ring being disposed to coact with the locking key to engage the nut to form a secure and positive connection between the nut and bolt. And the invention has as a still further object to provide an improved nut lock structure wherein the locking member may be readily applied in use and will normally resiliently grip the nut for maintaining it in position thereon.

Other and incidental objects will appear as the description proceeds and in the drawings, wherein I have illustrated the preferred embodiment of my invention and wherein similar reference characters designate corresponding parts throughout the several views, Figure 1 is a perspective view of my improved nut lock showing the bolt removed as well as illustrating the combined locking key and ring removed from the nut, Fig. 2 is a horizontal section showing the device assembled in operative position, this view also illustrating, in dotted lines, the position of the combined locking key and ring when partially removed, and Fig. 3 is a vertical section illustrating the coaction between the locking ring and the locking key in engaging the nut.

In the preferred embodiment of my invention, I employ a bolt 10 which is screw threaded adjacent one extremity in the usual manner to receive the nut 11, the said bolt upon one side coextensive with its threaded portion, being provided with a longitudinally extending slot or groove 12.

The nut 11 centrally thereof, is provided with the usual interiorly threaded bore 13 disposed to engage the threads of the bolt and upon one side is cut away to provide an annular locking ring seat 14, the seat 14 being concentric with the bore 13 and communicating therewith.

As best illustrated in Fig. 1 of the drawings the seat 14 is of a diameter greater than that of the bore 13 to define an offset at its inner extremity in which is formed an annular rack 15.

In connection with the bolt and nut thus formed, I provide a combined locking ring and key indicated as a whole at 16 in Fig. 1 of the drawings. More particularly, this element includes a key 17 which is straight and flat and is provided with a head 18 and a shank 19. The shank 19 is disposed to removably fit within the slot 12 of the bolt and at its extremity opposite the head 18 is cut away longitudinally upon its side edge opposite the head 18 as shown at 20 to provide a laterally projecting shoulder 21. Formed on the shank 19 at the adjacent extremity thereof and extending laterally from the shank in the same direction with the head 18, is a terminal spur 21', the said spur being disposed to engage within an annular beveled seat 21'' formed in the adjacent lower side face of the nut and surrounding the bolt opening therein, as best shown in Fig. 2 of the drawings, for maintaining the locking ring and key in operative position.

As illustrated, the head 18 projects laterally upon one side of the shank 19 while the inner edge of the said shank for the greater portion of the length thereof, is straight and uninterrupted to slide freely within the slot 12. The head 18 upon its inner edge is notched as shown at 22 to fit within the locking ring seat 14, the horizontal wall provided by said notch being arranged to rest against the upper face of the nut to slide freely thereover while the vertical wall of said notch is disposed to confront the smooth vertical wall of the seat 14. The inner extremity of the notch 22 of the head 18 is further cut away to provide a horizontally arranged shoulder 23 extending laterally from the straight inner edge of the shank 19 and being disposed to seat upon the rack 15 for engagement with the teeth thereof.

Secured at one extremity upon one side of the head 18 of the locking key is a split resilient locking ring 24 which is arranged in a plane substantially at right angles to the plane of the key 17 and the opposite free extremity of which is disposed to confront the opposite side of the head in spaced relation thereto as best illustrated in Fig. 3 of the drawings. Formed on the free extremity of the ring 24 is a laterally or downwardly projecting tooth or lug 25 disposed for selective engagement with the teeth of the rack 15, it being observed that the free extremity of the tooth 25 is arranged substantially in the same plane with the shoulder 22.

In assembling the device, the nut 11 is applied to the bolt in the usual manner and turned thereon to engage the work. The shank 19 of the locking key is then inserted within the groove 12 and the key then moved longitudinally within the said groove to bring the locking ring 24 within the seat 14 to bear over the rack 15. In this connection, attention is directed to the fact that the key 17 is limited in its inward movement within the slot 12 by the said ring and by the outer terminal shoulder 26 formed on the head 18 and previously referred to, the said shoulder bearing over the upper face of the nut. Preferably, the ring 24 is of a diameter slightly greater than the diameter of the annular seat 14 and the said ring being resilient, will consequently yieldably engage by its outer face against the vertical wall of the said seat to maintain the ring and key in operative position.

Particular attention is now directed to Fig. 3 of the drawings which particularly illustrates the manner in which the ring 24 is disposed to coact with the key 17 in engaging the nut. It will be observed that when the ring and key are applied in the manner just above set forth, the shoulder 22 of the key will seat upon the rack 15 to selectively engage the teeth thereof while the tooth 25 of the ring will also rest upon the said rack to also selectively engage its teeth, a simultaneous engagement of the shoulder and of the said tooth being had. The key 17 being operatively connected with the bolt 10 through the medium of its shank, the said shoulder and tooth will, therefore, engage the said rack at substantially any point in the turning movement of the nut 11, for maintaining the nut stationary upon the bolt. Particular attention is also directed to the fact that strain upon the locking member comprised in the combined locking ring and key, and exerted by retrograde movement of the nut 11 will be borne not alone by the locking ring 24, but will be distributed between the said ring and the key 17 so that the possibility of breakage will be reduced to a minimum.

From the preceding description, it will be seen that the locking member may be readily applied and removed in use. However, it may be desired to adjust the nut upon the bolt without entirely removing the locking member and as a means for facilitating this operation, I provide the notch 20, and shoulder 21. As shown in dotted lines in Fig. 2 of the drawings, the locking member may be withdrawn from within the slot 12 until the shoulder 21 engages over the adjacent end face of the bolt when the locking member will then be supported by the said shoulder while the free extremity of the shank 19 will be held in position within the slot 12 by the presence of the nut. The nut may then be adjusted longitudinally upon the bolt as desired and upon the completion of such adjustment, the locking member may then again be moved to operative position to engage the nut.

It will therefore be seen that I provide a very simple and efficient construction for the purpose set forth wherein the nut will be held at substantially any point in its turning movement upon the bolt; wherein the locking member will resiliently engage the nut to maintain it in operative position thereon, and wherein stress upon the said member will be distributed between a relatively fixed element and a yieldable element. It will further be seen that in thus distributing stress upon the locking member, the life thereof, under ordinary circumstances, will be greatly prolonged.

Having thus described my invention, what I claim and desire to secure by Letters Patent is:—

1. A device of the character described including a nut disposed for engagement with a bolt and having a locking ring seat formed therein, said seat terminating at its inner extremity in a rack, and a locking member including a key operatively engaging the bolt and having a shoulder formed thereon having locking engagement with the teeth of the rack, and a locking ring carried by said key and resting in said seat, said ring having locking engagement with the teeth of said rack and coacting with said shoulder in holding the nut against retrograde movement.

2. A device of the character described including a bolt having a slot formed therein, a nut engaging the bolt and provided with a locking ring seat terminating at its inner extremity in a rack, and a locking member including a key removably fitted in said slot and provided with a shoulder having locking engagement with the teeth of the rack, and a split locking ring carried by said key and resting in said seat, said locking ring being provided at its free extremity with a tooth having locking engagement with the teeth of the rack and coacting with said shoulder of the key in holding the nut against retrograde movement.

3. A device of the character described including a bolt having a slot formed therein, a nut engaging the bolt and provided with a rack, and a locking member including a key having a shank removably fitted in said slot, the said shank being notched at its inner extremity and upon one edge to provide a shoulder adapted for engagement over the free end face of the bolt with said notch bearing within said slot, and a locking ring carried by said key and selectively engaging the teeth of the rack.

In testimony whereof I affix my signature in presence of two witnesses.

WARNER KLETTKE. [L. S.]

Witnesses:
 HERBERT J. BOURDLAIES,
 GLODVIN J. ISAACSON.

Copies of this patent may be obtained for five cents each, by addressing the "Commissioner of Patents, Washington, D. C."